US005612865A

United States Patent [19]
Dasgupta

[11] Patent Number: 5,612,865
[45] Date of Patent: Mar. 18, 1997

[54] DYNAMIC HASHING METHOD FOR OPTIMAL DISTRIBUTION OF LOCKS WITHIN A CLUSTERED SYSTEM

[75] Inventor: Ranjan Dasgupta, Naperville, Ill.

[73] Assignee: NCR Corporation, Dayton, Ohio

[21] Appl. No.: 456,435

[22] Filed: Jun. 1, 1995

[51] Int. Cl.[6] ............................................. G05B 9/02
[52] U.S. Cl. ......................... 364/184; 395/800; 395/618
[58] Field of Search ............................. 364/184; 395/800, 395/600, 650

[56] References Cited

U.S. PATENT DOCUMENTS

| | | | |
|---|---|---|---|
| 4,553,205 | 11/1985 | Porchia | 364/300 |
| 4,648,030 | 3/1987 | Bomba et al. | 364/200 |
| 4,661,905 | 4/1987 | Bomba et al. | 364/200 |
| 4,706,190 | 11/1987 | Bomba et al. | 364/200 |
| 4,720,782 | 1/1988 | Kovalcin | 364/200 |
| 4,763,249 | 8/1988 | Bomba et al. | 364/200 |
| 4,769,768 | 9/1988 | Bomba et al. | 364/200 |
| 4,787,031 | 11/1988 | Karger et al. | 364/200 |
| 4,787,033 | 11/1988 | Bomba et al. | 364/200 |
| 4,833,599 | 5/1989 | Colwell et al. | 364/200 |
| 4,920,477 | 4/1990 | Colwell et al. | 364/200 |
| 4,926,375 | 5/1990 | Mercer et al. | 364/900 |
| 4,961,139 | 10/1990 | Hong et al. | 364/200 |
| 4,962,463 | 10/1990 | Crossno et al. | 364/518 |
| 5,016,159 | 5/1991 | Maruyama | 364/200 |
| 5,023,907 | 6/1991 | Johnson et al. | 380/4 |
| 5,029,164 | 7/1991 | Goldstein et al. | 370/95.1 |
| 5,043,886 | 8/1991 | Witek et al. | 364/200 |
| 5,057,837 | 10/1991 | Colwell et al. | 341/55 |
| 5,058,006 | 10/1991 | Durdan et al. | 364/200 |
| 5,109,512 | 4/1992 | Bahr et al. | 395/650 |
| 5,115,499 | 5/1992 | Stiffler et al. | 395/425 |
| 5,117,352 | 5/1992 | Falek | 395/575 |
| 5,175,852 | 12/1992 | Johnson et al. | 395/600 |
| 5,202,971 | 4/1993 | Henson et al. | 395/425 |
| 5,301,337 | 4/1994 | Wells et al. | 395/800 |
| 5,327,556 | 7/1994 | Mohan et al. | 395/600 |
| 5,339,427 | 8/1994 | Elko et al. | 395/725 |
| 5,440,732 | 8/1995 | Lomet et al. | 395/600 |

OTHER PUBLICATIONS

Digital Technical Journal, "The VAX/VMS Distributed Lock Manager", by William E. Snaman, Jr. et al.; pp. 29–44.

*Primary Examiner*—Paul P. Gordon
*Assistant Examiner*—Karen D. Presley
*Attorney, Agent, or Firm*—James M. Stover

[57] ABSTRACT

A method for redistributing the mastership of system resources among the processing nodes within the clustered computer system following a change in the system configuration, such as the failure of a processing node or the return to service of a failed processing node. The method includes the steps of: maintaining a set of hash buckets within each processing node; assigning each one of the resources to one of the hash buckets; and assigning a hash vector, determined through utilization of an N-way recursive algorithm, to each one of the hash buckets, each one of the hash vectors identifying the processing nodes within the clustered computer system in a predetermined sequence unique to the one of the hash buckets. Mastership of any system resource resides with the first processing node identified by the hash vector assigned to the hash bucket to which the system resource is assigned. Following the failure of a processing node, the method reassigns mastership of the system resources assigned to the set of hash buckets associated with a failed processing node the next processing node having an active state identified by the hash vector assigned to the set of hash buckets associated with the failed processing node. Mastership of the resources initially assigned to the set of hash buckets associated with the failed node is reassigned to the failed node upon return of the failed node to an active state.

5 Claims, 3 Drawing Sheets

FIG. 3

| | ALL NODES ACTIVE | HASH VECTORS | | | | NODE 1 INACTIVE |
|---|---|---|---|---|---|---|
| BUCKET 1 | 1 | 1 | 2 | 3 | | 2 |
| BUCKET 2 | 2 | 2 | 1 | 3 | | 2 |
| BUCKET 3 | 3 | 3 | 1 | 2 | | 3 |
| BUCKET 4 | 1 | 1 | 3 | 2 | | 3 |
| BUCKET 5 | 2 | 2 | 3 | 1 | | 2 |
| BUCKET 6 | 3 | 3 | 2 | 1 | | 3 |

DYNAMIC HASHING METHOD FOR OPTIMAL DISTRIBUTION OF LOCKS WITHIN A CLUSTERED SYSTEM

The present invention relates to a computer system having a cluster of processing elements, and more particularly to a method for distributing the mastership of system resources among the processing nodes within the clustered computer system.

BACKGROUND OF THE INVENTION

Within a computer system, a cluster is a collection of processing elements that is capable of executing a parallel, cooperating application. Each processing element in a cluster is an independent functional unit, such as a symmetric multiprocessor server, which is coupled with the other cluster elements through one or more networks, e.g., LANs, WANs, I/O buses. One type of cluster system is described in The VAX/VMS Distributed Lock Manager, by W. E. Snaman, Jr. and D. W. Theil, published in Digital Technical Journal, September 1987, and in U.S. Pat. No. 5,117,352, entitled "MECHANISM FOR FAIL-OVER NOTIFICATION" issued to Louis Falek on May 26, 1992 and assigned to Digital Equipment Corporation.

A parallel cooperating application in the context of a cluster executes on multiple cluster nodes and processes a shared object such as a database. A lock manager is required by such an application to synchronize and coordinate its activities on the shared object. Specifically, such a parallel application defines a set of locks, each of which control a portion or portions of the shared object(s) that the parallel application will process. Each parallel instance of the application is in agreement with each other with respect to the interpretation of the set of locks as defined. When an instance of the parallel application needs to access, e.g., read, modify, etc., a portion of the shared object, it needs to obtain a lock from the Lock Manager that provides it access privileges relevant to its desired operation on that portion of the shared object. Since the set of locks need to be accessed from within any of the instances, it must be a global entity, and the lock manager by definition needs to be a global or clusterwide resource.

A typical example of such an application is the Oracle Parallel Server. A typical clustered system configuration running the Oracle Parallel Server Application, using a Distributed Lock Manager, is depicted in FIG. 1. The system, as shown, includes multiple processor units 101 interconnected through a network 103, such as an Ethernet of Fiber Distributed Data Interface, and connected through a shared SCSI bus 105 to one or more database storage units 107.

The need for parallel applications on today's open systems has been generated from two basic requirements:

Increased throughput of the application, and

High availability of the application.

A clustered system must accordingly be designed such that no system element or component represents a single point of failure for the entire cluster. If the Lock Manager executed off of any one node of the cluster, or on a piece of dedicated hardware, then a failure of that node or the hardware would adversely affect all instances of the parallel application, since it cannot survive without the services of a Lock Manager. If on the other hand, the Lock Manager is distributed, then the surviving nodes can be designed to recover the lock database upon a node failure, and allow the parallel application on these nodes to continue their processing.

A Distributed Lock Manager (DLM) should also be capable of scaling its throughput capabilities along with the addition of nodes to the cluster. Since a DLM is not confined to a single node or a subset of nodes, it can take advantage of the increase in processing power along with the increase of nodes within the cluster.

Further, a DLM should allow for even distribution of lock management overhead across each functional element of the cluster on which the parallel application is executing. This way, no single node or subset of nodes are unevenly burdened with the responsibility of lock management.

OBJECTS OF THE INVENTION

It is therefore an object of the present invention to provide a new and useful method for distributing lock management overhead across functional elements within a clustered computer system.

It is another object of the present invention to provide such a method which provides for redistributing lock management overhead across functional elements following a change in the configuration of the clustered computer system.

It is yet another object of the present invention to provide such a method which provides for an even distribution of lock management overhead following the loss and/or addition of a functional element within the clustered computer system.

It is still a further object of the present invention to provide such a method which minimizes unnecessary redistribution of lock management overhead following the loss and/or addition of a functional element within the clustered computer system.

SUMMARY OF THE INVENTION

There is provided, in accordance with the present invention, a method for redistributing the mastership of system resources among the processing nodes within the clustered computer system following a change in the system configuration, such as the failure of a processing node or the return to service of a failed processing node. The method includes the steps of: maintaining a set of hash buckets within each processing node; assigning each one of the resources to one of the hash buckets; and assigning a hash vector to each one of the hash buckets, each one of the hash vectors to identifying the processing nodes within the clustered computer system in a predetermined sequence unique to the one of the hash buckets. Mastership of any system resource resides with the first processing node identified by the hash vector assigned to the hash bucket to which the system resource is assigned. Following the failure of a processing node, the method reassigns mastership of the system resources assigned to the set of hash buckets associated with a failed processing node the next processing node having an active state identified by the hash vector assigned to the set of hash buckets associated with the failed processing node.

In the embodiment of the invention described herein, hash vectors are determined through an N-way recursive algorithm, wherein N is the number of processing nodes within the clustered computer system. Additionally, the method reassigns mastership of the resources initially assigned to the set of hash buckets associated with the failed node back to the failed node upon return of the failed node to an active state.

The above and other objects, features, and advantages of the present invention will become apparent from the following description and the attached drawings.

BRIEF DESCRIPTION OF THE DRAWINGS

FIG. 3 provides a simple example of the redistribution of the mastership of system resources amount active processing nodes within a clustered system after the failure of a processing unit, in accordance with the present invention.

DETAILED DESCRIPTION OF THE PREFERRED EMBODIMENT

Figure 1:
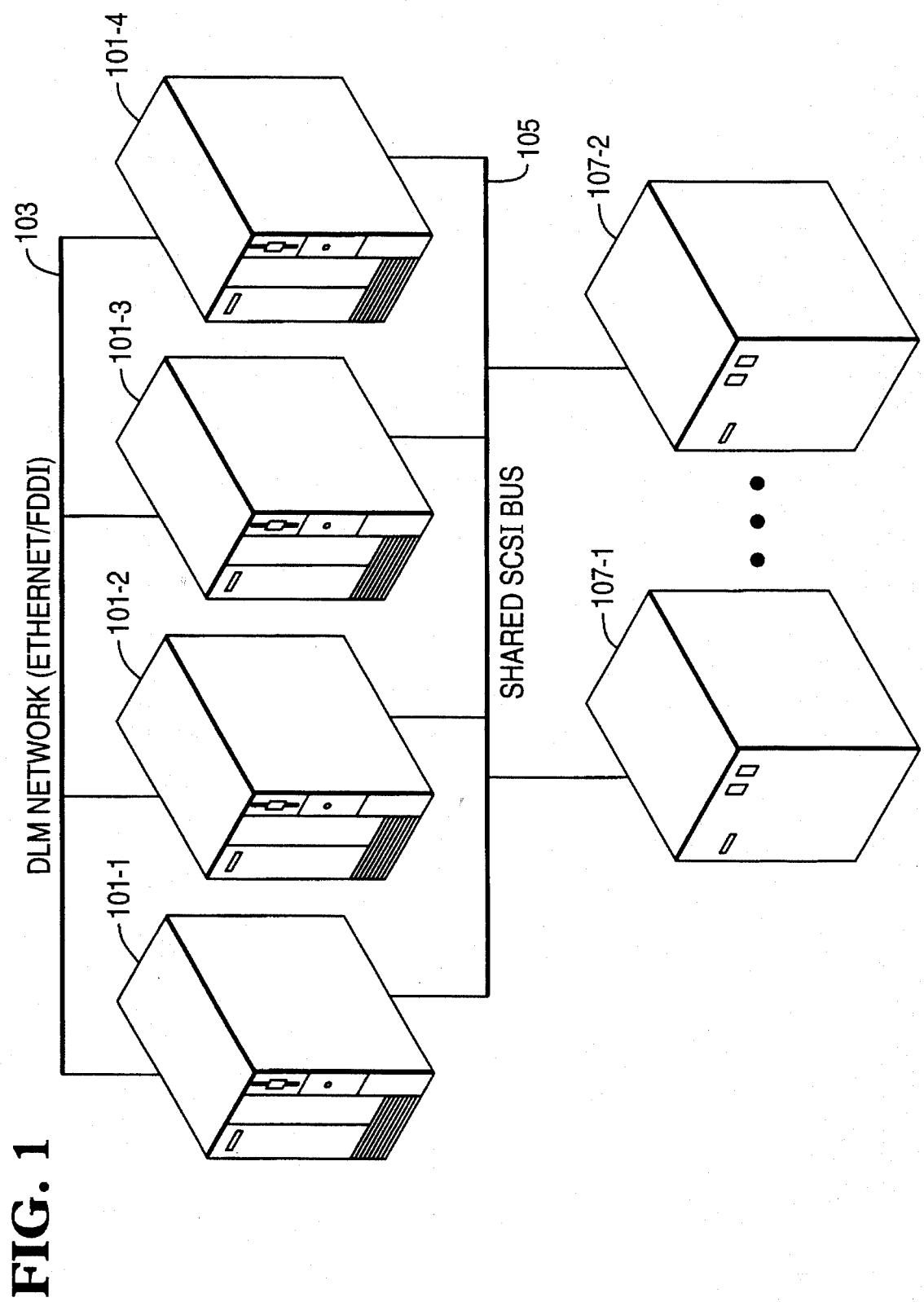
FIG. 1 is a simple block diagram illustration of a parallel cooperating application operating in a clustered computer system.

Functional Overview of a Distributed Lock Manager

A DLM executing on a cluster of nodes has the following functional responsibilities:

Lock Management. This constitutes the primary responsibility of the DLM. In this mode, the DLM serves in providing the basic lock management functionality as defined by the DLM API to which it is written.

Maintain Cluster Membership. The DLM is the sole keeper of the set of nodes that constitutes a cluster at a given point in time. This membership may be different from the total set of nodes that are physically present, and defines the set of nodes on which the parallel application can execute. The DLM will redefine this set of nodes after an event occurs which causes a change in the current cluster membership (such as a system boot, node failure, etc.).

Recover and Redistribute the Lock Database. When a node failure occurs, all locks that were being managed by the DLM instance on that node need to be recovered. The process of recovery of these locks involve:
1. Reconstitution of the exact status of these locks at the time of node death.
2. Redistribution of the management of these locks to other functional nodes of the new cluster.
3. Resumption of lock requests that were in-flight from DLM client processes to the dying node(s).
4. Release of all locks that were being held by the dead node prior to failure; thereby allowing other pending lock requests to be resolved.

The DLM goes through a similar set of events when a new node joins an existing cluster. The sequence of events that occur within the DLM as a result of a change of cluster membership (node death or node join) is termed as the cluster reconfiguration sequence in the rest of the document..

Resources and Locks

It is important to understand the terms resources and locks in the context of the DLM. A resource is the fundamental named object maintained by the DLM. A parallel application uses a resource to represent a shared object such as a disk block, a shared data structure, a database row etc. This resource (maintained by the DLM) is then used by the application to control access privileges to the shared object that the resource is coordinating. It is important to understand here, that although the DLM is the primary keeper of each resource, it is ignorant of the actual shared object associated with the resource; this interpretation is maintained by the parallel application.

A lock (in the context of the DLM) is used by the parallel application to obtain various access rights to the resource as described above. The Oracle DLM API defines 5 levels of access rights that can be obtained on a resource, through the use of API functions on a lock belonging to the resource. While a resource is a global entity, a lock is process specific, and denotes that process' interest in the resource.

Implementation of a Distributed Lock Manager

The functionality of the DLM during normal operation is built upon the following basic models.

The Shared Lock Database Model. In order to implement a low-latency low-overhead DLM, it is necessary to analyze the path traversed by a DLM lock request, and propose a path that is optimal in terms of latency and overhead. A typical implementation of the DLM consists of a "DLM server" process running on each cluster node, providing lock services for users on that node and for remote users sending requests for locks mastered at that node. This is a client-server implementation, where all lock requests generated on a node need necessarily pass through a server. This model has certain drawbacks:

Since all local request and remote requests directed to a node pass through a single process, it can be a potential bottleneck, especially if both the number of CPUs within a node and/or the number of nodes in the cluster increase.

Each lock request generated on a node necessitates at least two context switches (for both local and remote locks), for its resolution.

Another implementation scheme is a "fully Kernelized" DLM model. This scheme has a number of advantages; in particular it solves the inherent problems (as noted above) of the client-server scheme. However, such a scheme can impose a larger overhead and latency for resolution of local locks, by requiring a DLM user to issue an UNIX system call for every lock request. Also, if this kernel component needs to also integrate the communication needs of the DLM, it is likely to be a streams-based driver. Such an implementation is also likely to have higher latencies for local lock resolutions, as we wait for the streams scheduler to schedule its service procedures.

Figure 2:
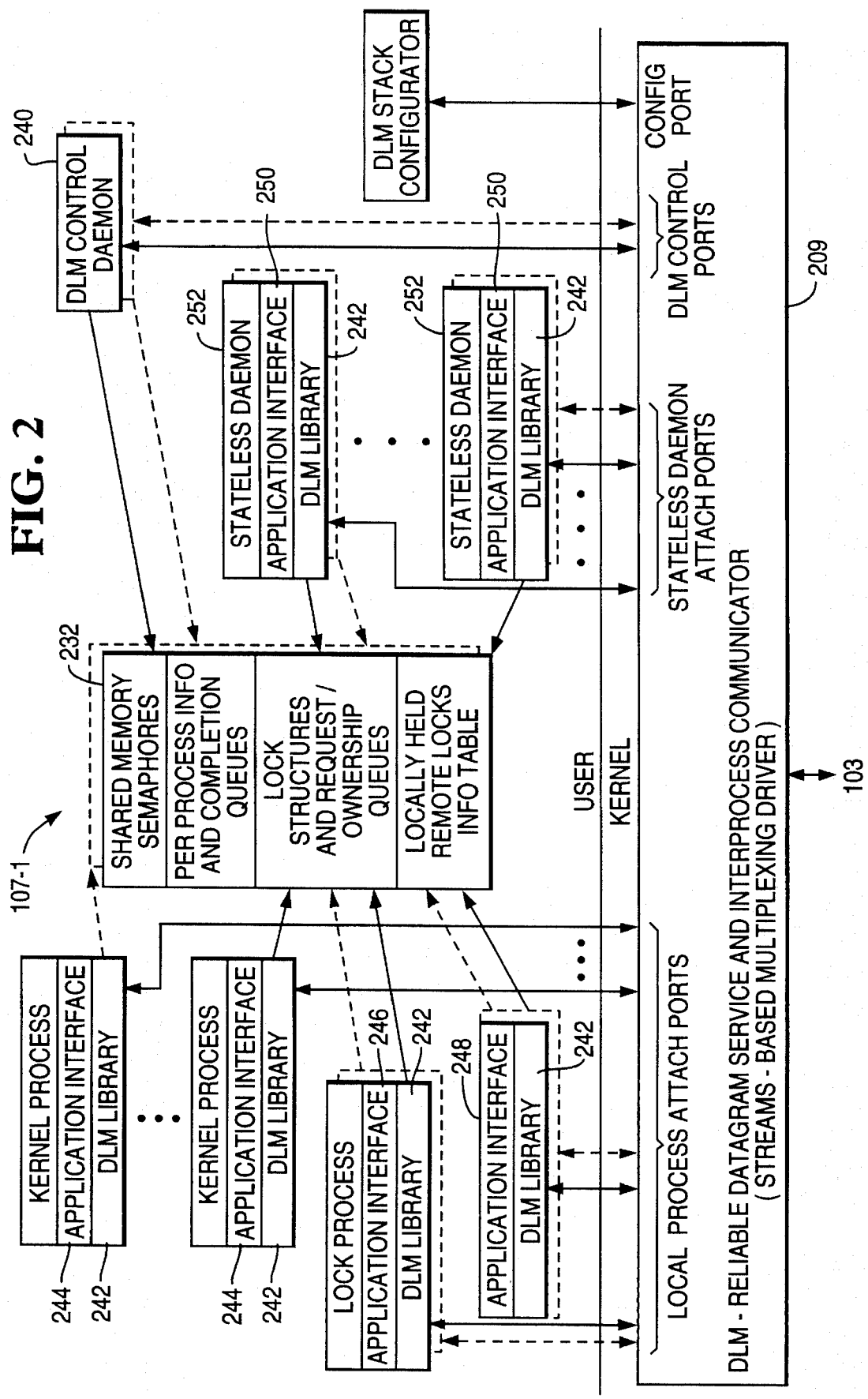
FIG. 2 provides a functional block diagram of the distributed lock manager (DLM) components resident on a local node within a clustered computer system.

The DLM implementation described herein attempts to optimize the overhead/latency requirements for local and remote lock requests, using a two-prong sharing scheme, a shared lock database, and a shared communication channel (the merits of the latter are discussed in the following subsection). In the shared lock database scheme, all DLM user and daemon processes have equal access to all lock and lock-related structures in the DLM's lock database resident on the local node. FIG. 2 provides a functional block diagram of the DLM structures resident on node 101-1 within the clustered system of FIG. 1. The description which follows should be understood to apply as well to the remaining processing nodes, 101-2 through 101-4, shown in FIG. 1.

Node 101-1 includes a local shared memory segment 232, which can be a random access memory. Local shared memory segment 232 stores status and control information for all the locks which are managed locally by the processing node 101-1. Further, local shared memory segment 232 stores status information for all the remote locks that processing node 101-1 accesses on the other nodes within the cluster. The local shared memory segment 232 stores data related to the shared locks and to the user processes accessing the locally managed locks.

Local shared memory segment 232 stores shared memory semaphores, process information and completion queues, lock structures and request/ownership queues, and information about local processes that request or own remote locks on processing nodes 101-2 through 101-4. Thus, local shared memory segment 232 stores the information necessary to manage the local locks assigned to processing node 101-1, as well as, a shadow record of each local process that accesses a shared object that is managed by a remote lock on a remote processing node 101-2 through 101-4.

A DLM control daemon 240 provides handling for any exception that occurs within processing node 101-1. DLM control daemon 240 only handles exceptions and not the normal lock request/grant/completion data, and thus, is not bottleneck for DLM operations. The normal lock request/grant/completion sequence is managed by DLM library 242. DLM library 242 is a dynamically linked process which is linked to each process requesting a locally managed lock. Applications and local processes have respective application interfaces 244, 246 and 248 to link to the DLM library 242. The DLM library 242 allows each application or local process to directly access shared memory segment 232 to request a lock of a shared object without changing from the context that the application or local process is running in. This manner of operation prevents time consuming context switching in order to process a local lock request.

For local applications or processes requesting a remote lock, the DLM library 242 provides access to the remote lock information locations within shared memory segment 232 to record the request and also provides direct issuance of a datagram to the remote lock within one of the other processing nodes 101-2 through 101-4. As with the local lock accesses, all of this is performed without a change of context from that of the application or process making the remote lock request.

Remote request received by processing node 101-1 via datagrams generated by one or more of the other processing nodes 101-2 through 101-4 within the cluster are processed by a group of stateless daemons 252. Each stateless daemon 252 has a respective interface 250 that receives datagrams from remote processing nodes 101-2 through 101-4 and performs the lock access for the remote application or process. Because there can be many stateless daemons available within each processing node 101-1 through 101-4, many remote lock requests can be processed in parallel. Datagram communication services for the distributed lock manager are provided by DLM driver 209.

The DLM system described herein provides for very low latency/overhead characteristics for resolution of local locks, since no context switches or system calls are required for such requests. This scheme coupled with the shared communication strategy (as discussed in below) is also the optimal strategy for resolution of remote lock requests.

The Shared Communication Model. As discussed in the previous section, a local lock request can be resolved within the context of the DLM shared library. However, if the lock is remotely mastered, a request needs to be sent to the master node and a response received back from it. If a traditional client-server DLM implementation is used, we would need at least 2 context switches on the local node to accomplish this.

A more optimal scheme would require the DLM shared library to have the capability of directly sending the lock request to the master node over a network, and subsequently directly receiving the response back from the said node. If a standard protocol package such as TCP/IP or OSI were to be used for this purpose, a number of issues arise:

Each DLM user process (in the case of Oracle, this means each Oracle user) needs to maintain a virtual circuit to some daemon process on every other node in the cluster. If for example, there are 500 users per node on a 4-node cluster, the total number of virtual circuits originating from local users within a node would be 1500. Further, if there is a server process(s) that handles remote requests from DLM client processes on remote nodes, the total number of VCs originating from such clients and terminating onto the said server process would be once again 1500. While it is unclear whether a single UNIX process can handle that many VCs, it is more alarming to contemplate the amount of overhead that will result from the management of this number of VCs within each node of the cluster.

The overhead of executing TCP/IP for lock management traffic is substantial, since a request/response traverses 3 layers of protocol processing before it reaches the network or before it is delivered to the desired user process. This level of protocol sophistication is both unnecessary and costly for the needs of the DLM. Since the DLM operates on a single LAN, routing features of the protocol are unnecessary.

While being very general in nature, a standard protocol package such as TCP/IP cannot be tailored to certain specific needs of the DLM, as we shall encounter in the proceeding sections.

The DLM implementation described herein employs a streams-based DLM driver 209 that encompasses a communication service that is tailor-made and optimized for the specific needs of the DLM. This communication service maintains one virtual circuit (VC) for each remote node in the cluster. In the above example of a 4-node cluster, the number of VCs maintained on each node would be 3, and is independent of the number of client processes. These VCs are shared by all the DLM client processes and daemon processes on that node. From the point of view of the client and daemon processes, each such process establishes a single stream to the communication service. Using this stream, the above processes can directly access the network and send data packets to any other node in the cluster. The user process formulates the data packets, stamps the node id of the destination node and hands over the packet to the communication service. The communication service in turn is responsible for guaranteeing reliable, sequenced delivery of these user datagrams to the destination node, with the lowest possible overhead. This feature of sharing a set of VCs for all DLM users/daemons on a particular node provides the users with a Reliable Datagram Service for communicating with the other nodes.

Additional details of the DLM implementation discussed above is provided in U.S. patent application Ser. No. 08/456,434, filed concurrently herewith. U.S. patent application Ser. No. 08/456,434, entitled "Reliable Datagram Service Provider for Fast Messaging in a Clustered Environment," by Ranjan Dasgupta, is assigned to AT&T Global Information Solutions Company.

Cluster Reconfiguration

The functionality of the DLM during a cluster reconfiguration activity is implemented utilizing the following basic guidelines.

The Re-entrant State Machine Model. The daemon process that controls the activities of the DLM during the reconfiguration mode (the Control Daemon) is implemented using a re-entrant state machine architecture. The cluster reconfiguration phase is divided into five states. Each state of the reconfiguration activity is implemented as a state in the state machine. While within a particular state, the state machine also has sub-states that it traverses to perform all the activities relevant to that state. Transition from sub-state to sub-state or from state to state is purely event-driven. It is possible to move forward from state to state (as the reconfiguration proceeds normally), or to move backward, or even start all over again if certain events require the DLM to do so. This feature of the reconfiguration mode has distinct advantages that can differentiate this implementation of the DLM from other ones:

- The DLM can sustain node failure or failures if they happen while the DLM is already in the middle of a reconfiguration activity. Since failures are random events, it is not possible to dictate when they are going to occur, or when they should not occur. This feature of the DLM is a direct consequence of its state machine architecture.
- Since the Control Daemon controls the reconfiguration activity, instead of actually performing some of the lengthy activities (like lock redistribution and reconstitution), such actions can be kicked off and executed in parallel by a set of "helper" processes. While such actions are in progress, the Control Daemon is free to monitor major events, if they occur, abort and rollback the current activity if required, and make the appropriate state changes as necessary.

Client Quiescing. Before cluster reconfiguration can proceed, the DLM needs to ensure that the lock database on each machine on the cluster has been carried forward to a consistent and stable state. In a client-server model this is achieved by stopping any further requests from the clients and allowing the server to service all pending requests. In the shared model however, each DLM client is also a "server", hence it is necessary to employ a tight handshaking scheme with these clients to ensure that they have reached a well defined state where they may be paused for the remainder of the cluster reconfiguration activity. It can be viewed broadly as two activities, a required one and an optional one as described below:

- In the first phase of quiescing, all client processes are given time to complete posting a DLM request that they may be in the process of doing, and then stopped from posting any additional ones. After this, the DLM driver handshakes with the clients to ensure that no requests/responses are present on their respective streams. This action is required to ensure that the DLM clients have reached a stable state with respect to submitting requests and modifying locks within the lock database.
- In the subsequent phase of quiescing, each DLM instance steps through a pairwise quiescing protocol with each currently live node in the cluster. This protocol again involves handshaking with DLM clients and daemons locally, and with the respective clients and daemons on each other node to ensure that all currently pending requests/responses are sent, serviced, returned and processed to completion. Any node that can carry this protocol to completion with respect to another node are deemed to have fully quiesced with respect to this node. These two nodes can be referred to as a fully quiesced pair. If these nodes fall short of satisfying the quiescing protocol, then they are referred to as an unquiesced pair. This protocol is not necessary, however it significantly reduces the lock redistribution volume during the redistribution phase.

Hashing and Redistribution. As described earlier, each resource and its corresponding locks is mastered on a specific node in the cluster. The mastership of a given resource is predetermined by a hashing function which hashes the name of the resource to one of the currently active nodes in the cluster. The hashing function takes the following parameters into account:

- The name of the resource.
- The maximal cluster, i.e., the maximum set of nodes that can be present in the cluster, as defined in the DLM configuration file.
- The current cluster membership, i.e., the set of nodes that define the current state of the cluster.

The hashing function has the following specific properties:

1. For any current cluster membership, the hashing function guarantees that the mastership of resources will be evenly distributed amongst the members.
2. If a cluster reconfiguration occurs, and the cluster membership changes from any subset to any subset of the maximal cluster (including the maximal cluster itself), then the hashing function guarantees that the mastership of any particular resource will not move from node "x" to node "y", where both nodes "x" and "y" were members of the previous cluster and are also both members of the new cluster. To illustrate this with an example, let us take the example of a cluster consisting of nodes A, B, C and D. If node D goes down, the new cluster definition will be A, B and C. The hashing function will guarantee that the mastership of any particular resource has not moved from A→B or B→C or C→A. Hence, we can deduce that all redistributions that have occurred is restricted to (D→A, D→B, D→C). This property holds good for any arbitrary "old" membership going to any arbitrary "new" membership. Also, the movement of resources occur in a way that preserves property 1.

These above properties are very beneficial in that they require a minimal movement of resources, thus helping reduce the time interval required to relocate resources and locks.

Once a new cluster is formed, the hashing function is used to evaluate the hash vector, which defines the mastership of DLM resources. Once the mastership of resources have been defined, resources and locks that need to be redistributed as a result of the new mastership definition are redistributed in the following fashion:

- If a particular node is fully quiesced with respect to another node, it will send to it only those resources/locks that were remastered from this node to the other node and vice versa.
- If a particular node fell short of fully quiescing with another node, this situation between these two nodes is termed as an unquiesced pair. A node in an unquiesced pair will throw away all locks belonging to the other node for which this node is the master and vice versa. Consequently, each node will transmit all shadow information on its node to the other node for which the other node is the master and vice versa. This transmittal of shadow information allows an unquiesced pair to reconstitute the lock database with respect to each other. The number of unquiesced pairs in a new cluster can range from 0 to all possible pairs that can be derived from the set of cluster members.

Once the resources are remastered and the quiesce status for each pair of nodes are known, the redistribution of resources/locks are carried out in parallel by a set of daemon processes called the stateless daemons.

A detailed description the hashing function discussed above will now be provided.

Resource Hashing and Rehashing

As explained earlier, a resource has a specific node on which it is mastered. This node is a function of the name of the resource and the cluster composition at the time the resource is accessed. Each node of the cluster maintains a set of hash buckets, onto which resources are hashed. Each bucket contains a node id; this node id is the master node for all resources that happen to hash onto that bucket. The hash buckets are populated with node ids during the cluster reconfiguration activity, after the cluster composition has been determined. The properties of the assignment of node ids to buckets are twofold:

For any cluster configuration, the assignment is such that there is an even load balance amongst the existing cluster members.

When a cluster configuration changes from any arbitrary set "x" to any other arbitrary set "y", the node id on any hash bucket will not change from a previously live node to another live node; thus causing unnecessary redistribution traffic during lock redistribution.

These properties are ensured by using an n-way recursive algorithm that predetermines the assignment of node ids to buckets for any cluster composition. This assignment algorithm is discussed below:

Subvector Generation for each Hash Bucket. Each hash bucket has a subvector associated therewith, which is used to determine the master node id for that bucket, given the cluster composition. The subvector contains node ids in a specific order, and contains "n" elements, where "n" is the total number of nodes in the cluster. For a four-node cluster, an example of a subvector is (2, 4, 5, 1 ). The DLM incorporates a recursive function genvec_table[ ], that initially generates such subvectors. The first live node in a subvector is chosen to be the master node id for a given hash bucket. In the above example, if nodes (1,2) are down, then the master node id will be 4, since it is the first node (scanning from the left) to be live. The table generated by genvec_table is a specific permutation of nodes for each hash bucket. Since there are n! permutations for n numbers, the subvector table for a given set of hash buckets is known to repeat itself every n! buckets. Hence, genvec_table[ ] is setup to generate n! subvectors. The only parameter passed into genvec_table[ ] is a permutation of node ids that have already been entered into a set of subvectors. This parameter is called the elim_vector, i.e., the set of nodes that have already been considered. To start with genvec_table[ ] is called with a NULL vector, signifying that no node id has yet been considered for any bucket. In the first iteration, genvec_table[ ] assignes the node ids (1, 2, 3, 4) in repeated order to each bucket. It will then call genvec_table(1) for all buckets that have been assigned node id 1, genvec_table(2) for all buckets that have been assigned node id 2 and so on. In the subsequent recursion, it will call genvec_table(elim_vector) for all buckets whose subvector has already been populated with elim_vector as the first few elements. This recursion pattern is pursued until the elim_vector contains all the node ids in the maximal cluster composition.

Assignment of Node ID for a Given Cluster Composition. We now need to consider how each subvector is used to assign a specific master node id for a bucket, given a cluster composition. In particular, the assignment algorithm needs a list of all nodes that are NOT in the cluster. When given this list, the assignment algorithm (calc_master[ ]), will choose the first node id that is a live node. This will ensure the following:

All nodes to the left of the one chosen in the subvector are down nodes.

Consider the subvector to the left of the chosen node id. If we pick out all similar such subvectors, then we will see that the chosen node id is round-robin'ing amongst the currently live node ids. This property will be true for any such arbitrary subvector we chose. Hence we know that the set of chosen node ids are evenly distributed amongst the buckets, leading to even load distribution.

If we apply the same assignment for a subsequent cluster reconfiguration, then a master node id chosen to the left of where we are will designate that a down node has been brought into service, i.e., the mastership of this bucket moved from an previous node to a node that was newly introduced to the cluster. If the master node id chosen is to the right of where we are, then we know that the previous master must have exited the cluster. Hence, we know that movement from a live node to another live node is not feasible.

FIG. 3 provides a simple example of the establishment and use of hash vectors for the redistribution of the mastership of system resources among active processing nodes within a clustered system following the failure of a processing unit. Referring to FIG. 3, six hash buckets are shown, the buckets and their associated resources initially assigned as follows to three nodes, numbered 1 through 3, within a three-node cluster: buckets 1 and 4 are initially assigned to Node 1, buckets 2 and 5 are initially assigned to Node 2, and buckets 3 and 6 are initially assigned to Node 3. The hash vectors for the buckets are as follows:

Bucket 1 (1, 2, 3)

Bucket 2 (2, 1, 3)

Bucket 3 (3, 1, 2)

Bucket 4 (1, 3, 2)

Bucket 5 (2, 3, 1)

Bucket 6 (3, 2, 1)

Following a failure of Node 1, bucket 1 is reassigned to Node 2, and bucket 4 is reassigned to Node 3, i.e., the second coordinates in the hash vectors for buckets 1 and 4, respectively. The remaining buckets are not reassigned. Thus, following reassignment, buckets 1, 2 and 5 are assigned to Node 2 and buckets 3, 4 and 6 are assigned to Node 3. Should Node 1 be returned to service, buckets 1 and 4 will be reassigned to Node 1.

It can thus be seen that there has been provided by the present invention a new and useful method for redistributing the management of system resources across the functioning processing nodes within a clustered computer system following the failure of a processing node and subsequent reconfiguration of the clustered computer system. The method described above provides for an even distribution of lock management overhead following a system reconfiguration, and minimizes unnecessary redistribution of lock management overhead following a system reconfiguration.

Although the presently preferred embodiment of the invention has been described, it will be understood that various changes may be made within the scope of the appended claims.

What is claimed is:

1. In a clustered computer system including a network of processing nodes, resources shared by said processing nodes, and a distributed lock manager for coordinating processing activities within the clustered computer system, the improvement comprising a method for evenly distributing the mastership of said resources within a clustered computer system amongst the processing nodes, said method comprising the steps of:

maintaining a set of hash buckets within each processing node;

assigning each one of said resources to one of said hash buckets;

assigning a hash vector to each one of said hash buckets, each one of said hash vectors identifying said processing nodes in a predetermined sequence unique to said one of said hash buckets, mastership of the resources assigned to any one of said hash buckets residing with the first processing node identified by the hash vector assigned to said one of said hash buckets; and reassigning mastership of the resources assigned to said set of hash buckets associated with one of said processing nodes following a failure of said one of said processing nodes to the next processing node having an active state identified by the hash vector assigned to said set of hash buckets associated with said failed processing node.

2. The method according to claim 1, wherein:

each one of said hash vectors identifies each one of said processing nodes within said clustered computer system, the sequence in which said processing nodes are identified being unique to each one of said hash vectors.

3. The method according to claim 2, wherein said hash vectors are determined through an N-way recursive algorithm, wherein N is the number of processing nodes within said clustered computer system.

4. The method according to claim 1, further including the step of:

reassigning mastership of the resources initially assigned to said set of hash buckets associated with said failed node to said failed node upon return of said failed node to an active state.

5. The method according to claim 1, wherein said hash vectors for a set of hash buckets associated with each one of said processing nodes are selected to evenly distribute the mastership of the resources assigned to said set of hash buckets associated with each one of said processing nodes to the processing nodes within said clustered computer system having an active state.

* * * * *